United States Patent
Nagano

Patent Number: 5,287,766
Date of Patent: Feb. 22, 1994

[54] SPEED CONTROL APPARATUS FOR A BICYCLE

[75] Inventor: Masashi Nagano, Osaka, Japan

[73] Assignee: Shimano Inc., Osaka, Japan

[21] Appl. No.: 869,010

[22] Filed: Apr. 16, 1992

[30] Foreign Application Priority Data

Apr. 19, 1991 [JP] Japan .................. 3-087974

[51] Int. Cl.$^5$ .................. F16C 1/10
[52] U.S. Cl. .................. 74/502.2
[58] Field of Search .................. 74/502.2, 489

[56] References Cited

U.S. PATENT DOCUMENTS

| | | | |
|---|---|---|---|
| 4,325,267 | 4/1982 | Kojima | 74/489 |
| 4,995,280 | 2/1991 | Tagawa | 74/502.2 X |
| 5,009,629 | 4/1991 | Tagawa | 74/502.2 X |
| 5,012,692 | 5/1991 | Nagano | 74/502.2 X |
| 5,052,241 | 10/1991 | Nagano | 74/502.2 |
| 5,094,120 | 3/1992 | Tagawa | 74/502.2 X |
| 5,178,033 | 1/1993 | Kund | 74/502.2 X |

FOREIGN PATENT DOCUMENTS

| | | | |
|---|---|---|---|
| 352732 | 1/1990 | European Pat. Off. | |
| 2632266 | 6/1989 | France | |
| 55-20909 | 6/1980 | Japan | 74/502.2 |
| 59-43191 | 12/1984 | Japan | 74/502.2 |
| 2-38199 | 2/1990 | Japan | 74/502.2 |
| 1079656 | 8/1954 | United Kingdom | 74/502.2 |
| 91/14614 | 10/1991 | World Int. Prop. O. | 74/502.2 |

*Primary Examiner*—Leslie A. Braun
*Assistant Examiner*—Ryan W. Massey
*Attorney, Agent, or Firm*—Dickstein, Shapiro & Morin

[57] ABSTRACT

A bicycle speed control apparatus attached to a handlebar having a grip. This apparatus comprises a bracket fixed to the handlebar and having an extension extending away from the handlebar; a support shaft attached to the extension and extending substantially perpendicular a direction in which the grip extends; a shift lever having a control knob provided in a distal end region thereof; and a control device for controlling a change speed wire based on a pivotal displacement of the shift lever. The shift lever is pivotable about the support shaft and has a range of pivotal movement such that a tangent to a substantial locus of movement of the control knob approximates the direction in which the grip extends. This locus of movement is substantially within a width of the grip as seen from an end face of the support shaft. Consequently, the control knob is maintained at a substantially constant short distance to the grip throughout the range of pivotal movement of the shift lever.

5 Claims, 7 Drawing Sheets

SPEED CONTROL APPARATUS FOR A BICYCLE

CROSS-REFERENCE TO RELATED APPLICATION

This application is related to U.S. application Ser. No. 790,164, filed on Nov. 12, 1991 by the same inventor herein.

BACKGROUND OF THE INVENTION

1. Field of the Invention

The present invention relates to a bicycle speed control apparatus attached to a handlebar having a grip.

2. Description of the Related Art

A conventional bicycle speed control apparatus has a shift lever pivotable about an axis extending perpendicular to a handlebar axis from a position adjacent the handlebar axis as disclosed in U.S. Pat. Nos. 4,699,018 and 5,052,241, for example. A control knob formed on the shift lever describes a locus of movement between a position close to the handlebar or a grip of the handlebar, and a position remote therefrom. Thus, when the shift lever is operated by the thumb of a hand holding the grip, the thumb moves toward and away from the fingers holding the grip. Where the speed control apparatus is designed to set the control knob at a short distance to the grip when the shift lever is in home position, the thumb operating the shift lever must be stretched to a remote position at the end of a shifting operation. Conversely, where the speed control apparatus is designed to set the control knob at a short distance to the grip when the shift lever is at an end of its shifting range, the thumb used to operate the shift lever must be stretched to a remote position at the beginning of a shifting operation.

As a further point to be considered, since the distance between the thumb operating the shift lever and the fingers holding the grip is variable, it may be difficult to operate the shift lever with the thumb alone. The shift lever may have to be operated in one direction with the first finger and in the other direction with the thumb. In such a case, a shifting operation requires use of the thumb and one finger, leaving the remaining three fingers to hold the grip of the handlebar, which results in riding instability. It is still more difficult to carry out a shifting operation while applying the brake.

SUMMARY OF THE INVENTION

The object of the present invention is to provide a bicycle speed control apparatus enabling the cyclist to carry out a shifting operation stably while holding the handlebar firmly at all times. Preferably, such a speed control apparatus should enable the cyclist to operate a shift lever back and forth stably only with a thumb.

The above object is fulfilled, according to the present invention, by a bicycle speed control apparatus comprising a shift lever pivotable about a support shaft disposed below a grip of a handlebar, the shift lever having a range of pivotal movement to contain a locus of movement of a control knob of the shift lever within a level range corresponding to the grip.

According to the above construction, the cyclist may place the thumb of the hand gripping the handle bar in contact with the shift lever and operate the shift lever substantially along the grip portion of the handlebar to any control position. The thumb lies very close to the grip portion regardless of the position to which the shift lever is operated. Thus, the cyclist may firmly hold the handlebar with all of his or her fingers.

In a preferred embodiment of the invention, a brake lever is disposed adjacent the shift lever to pivot on a plane of pivotal movement of the shift lever or on a plane parallel to the plane of pivotal movement of said shift lever. The brake lever has a range of pivotable movement between a brake releasing position remote from the grip and a brake applying position close to the grip. This construction enables the cyclist to hold the grip portion with the third finger and little finger, hook the brake lever with the first and second fingers, and place the thumb on the shift lever. In this way, the cyclist may be able to carry out a braking operation and a shifting operation instantly and simultaneously while holding the grip portion.

Other features and advantages of the present invention will be apparent from the description of the preferred embodiment to be had with reference to the drawings.

DETAILED DESCRIPTION OF THE PREFERRED EMBODIMENT

Figure 1:
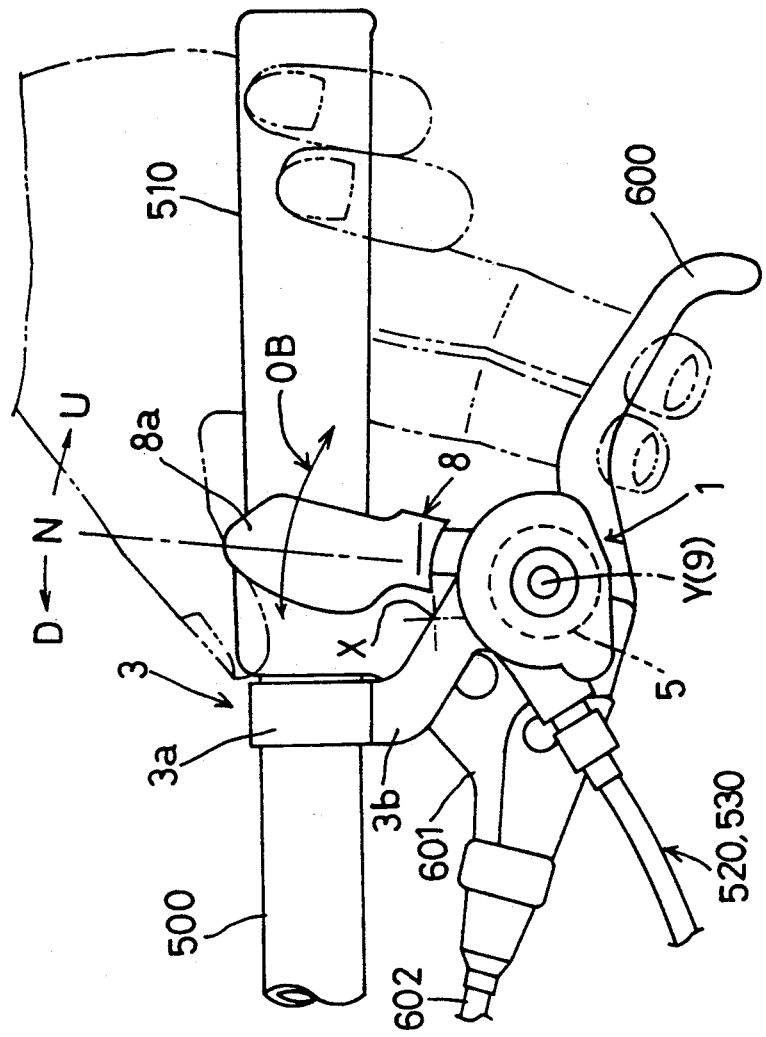
FIG. 1 is a bottom view of a speed control apparatus and a brake lever attached to a handlebar.
Figure 2:
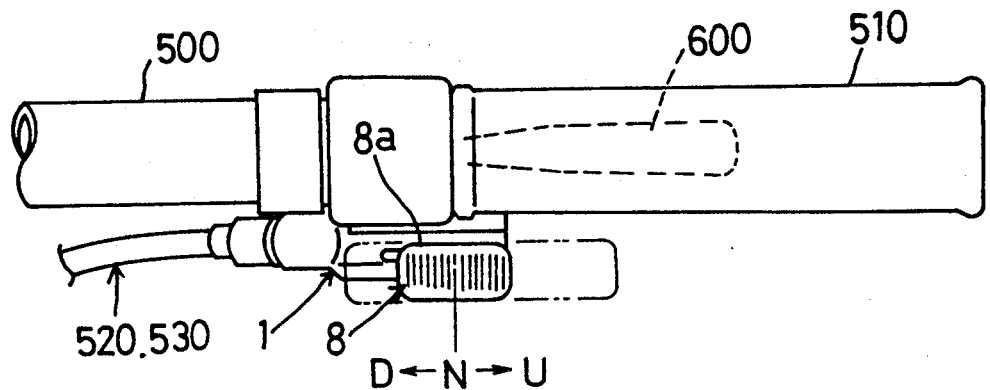
FIG. 2 is a rear view of the components shown in FIG. 1.
Figure 3:
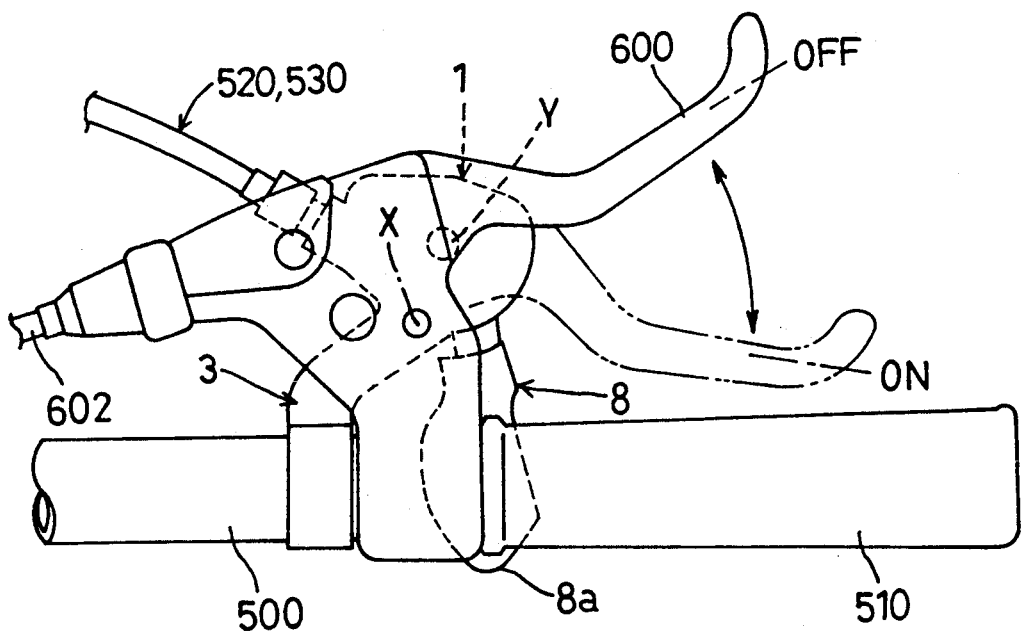
FIG. 3 is a plan view of the components shown in FIG. 1.

As shown in FIGS. 1 through 3, a pivotable brake lever 600 is attached to a bicycle handlebar 500 through a mounting bracket 601. Pivotal movement of the brake lever 600 is transmitted to a brake device (not shown) through a brake operating release cable 602. A speed control apparatus 1 includes a pivotable shift lever 8 attached to the handlebar 500 through a mounting bracket 3. For transmitting pivotal movement of the shift lever 8 to a derailleur (not shown), the speed control apparatus 1 has a change speed release cable including an inner cable 520 and an outer sleeve 530. The bracket 3 includes a ring element 3a secured to the handlebar 500, and an extension 3b extending outwardly from a peripheral position of the ring element 3a.

The brake lever 600 is supported by the mounting bracket 601 to be pivotable about an axis X between a brake applying position with a free end thereof lying close to a grip 510 of the handlebar 500, and a brake releasing position with the free end lying away from the grip 510 and a distal end of the brake lever 600 contacting a stopper (not shown) of the bracket 601. The brake lever 600 is operable to the brake applying position by fingers of the cyclist's hand holding the grip 510. When released, the brake lever 600 automatically returns to the brake releasing position under tension of the brake operating wire 602.

Figure 4:
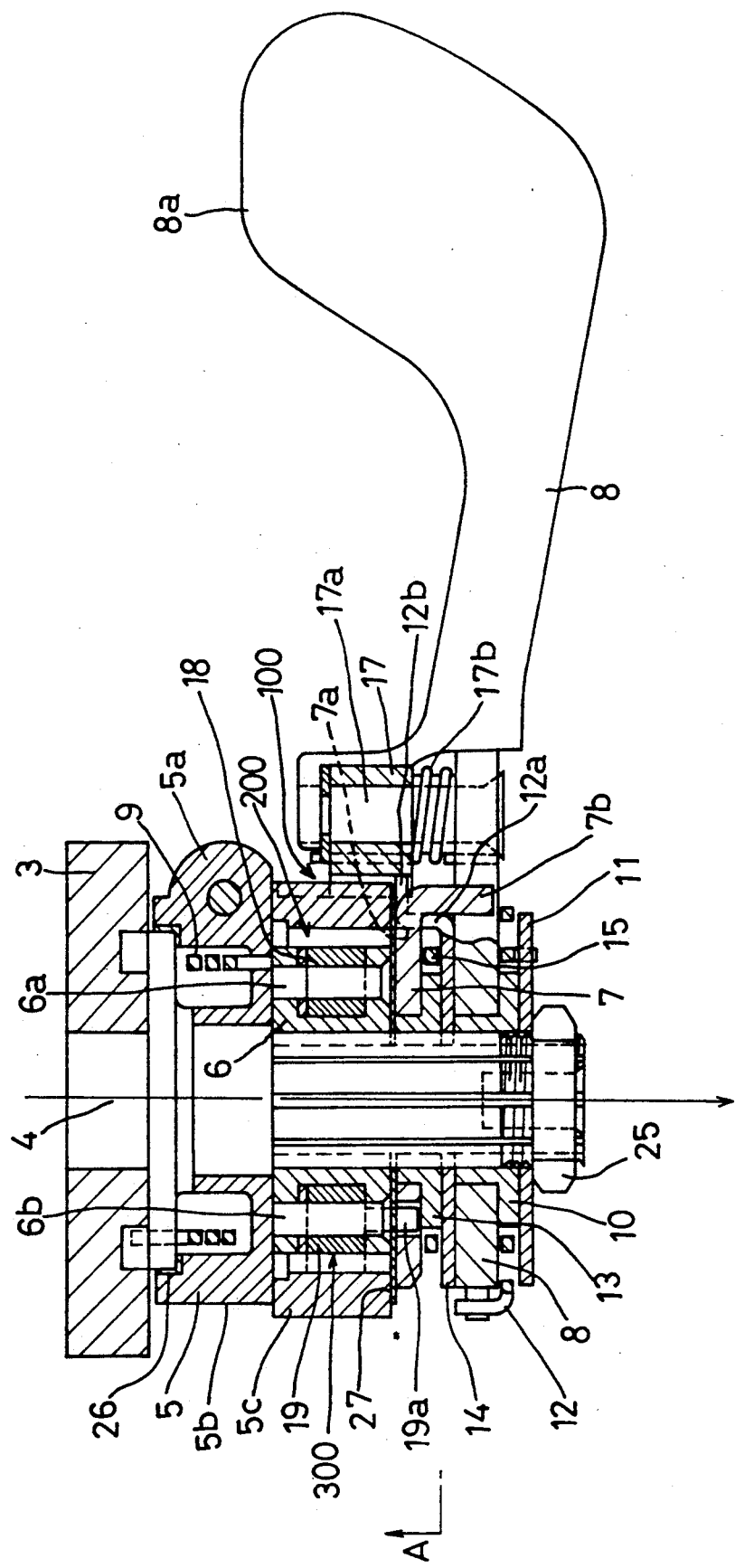
FIG. 4 is a view in vertical section of the speed control apparatus.

As shown in FIG. 4, the speed control apparatus 1 includes a takeup reel 5 rotatable with the pivotal movement of the shift lever 8 for winding the inner wire 520 thereon, and a ratchet mechanism for allowing the takeup element 5 to rotate in a wire winding direction and a wire unwinding direction. With the pivotal movement of the shift lever 8, the inner wire 520 is pulled to switch the speed control apparatus 1 to an accelerating position, and relaxed to switch the apparatus 1 to a decelerating position. This mechanism will be described in detail later.

As seen from FIG. 1, the shift lever 8 is supported by the mounting bracket 3 in a position below the grip 510 of the handlebar 500 to be pivotable about an axis Y substantially parallel to the pivotal axis X of the brake lever 600. The shift lever 8 includes a plastic control knob 8a formed in a distal region thereof, which knob describes a locus of movement OB extending substantially along the grip 510. The length and pivoting range of the shift lever 8 and the shape of the extension 3b of the mounting bracket 3 are determined so that the locus of movement OB of the control knob 8a is contained in the width of the grip 510 seen in FIG. 1. Specifically, the extension 3b of the bracket 3 carries a support shaft 4 defining the axis Y and extending substantially perpendicular to the grip 510, and the shaft lever 8 is pivotable about the support shaft 4. The pivoting range of the shift lever 8 is determined such that a tangent to the locus of movement OB of the control knob 8a approximates the longitudinal direction of the grip 510. That is, the control knob 8a has a substantially constant short distance to the grip 510 throughout the pivoting range of the shift lever 8.

The pivoting range of the shift lever 8 includes a neutral or home position N in the middle thereof. From the home position N, the shift lever 8 is pivotable in one direction U for an up-shift or higher speed and in the other direction D for a down-shift or lower speed. The shift lever 8 is biased to return to the home position automatically. For operating the shift lever 8, for example, the cyclist places only the tip end of the thumb of his or her hand holding the grip G in contact with the control knob 8a, and then stretches the thumb for operating the lever 8 in the down-shift direction D or bends the thumb for operating the lever 8 in the up-shift direction U. When the thumb is removed from the control knob 8a, the shift lever 8 returns to the home position N.

When the shift lever 8 is operated in the down-shift direction D from the home position N, the takeup reel 5 is rotated in the wire winding direction to pull the wire 520. When the shift lever 8 is operated in the up-shift direction U from the home position N, the takeup reel 5 is rotated in the wire unwinding direction to relax the wire 520. Even when the shift lever 8 returns to the home position N, the takeup reel 5 is retained in a position to which the reel 5 has been rotated, thereby to maintain a speed obtained.

The control knob 8a has a knurled surface to avoid slipping of the thumb thereon, thereby to assure reliable shifting operations.

As shown in FIG. 4, the speed control apparatus 1 includes the support shaft 4 extending from the extension 3b of the bracket 3. The support shaft 4 carries the takeup reel 5 for winding the wire 520 thereon, a position retaining unit 6, a release element 7 and the shift lever 8 coaxially arranged in the stated order. The support shaft 4 is formed as a spline shaft not rotatable relative to the bracket extension 3b.

The takeup reel 5 includes a wire engaging section 5a and a wire winding section 5b formed peripherally thereof. The takeup reel 5 is rotatable relative to the support shaft 4, and urged in the wire unwinding direction by a first spring 9 mounted between the takeup reel 5 and bracket extension 3b. Further, the takeup reel 5 includes a bush 5c as an integral part thereof surrounding the support shaft 4.

The shift lever 8 is pivotably supported at a proximal end thereof on the support shaft 4 through a spacer 10. The shift lever 8 is urged in the wire unwinding direction by a second spring 12 relative to a first stopper plate 11 mounted on the support shaft 4 not to be rotatable relative thereto.

Figure 5:
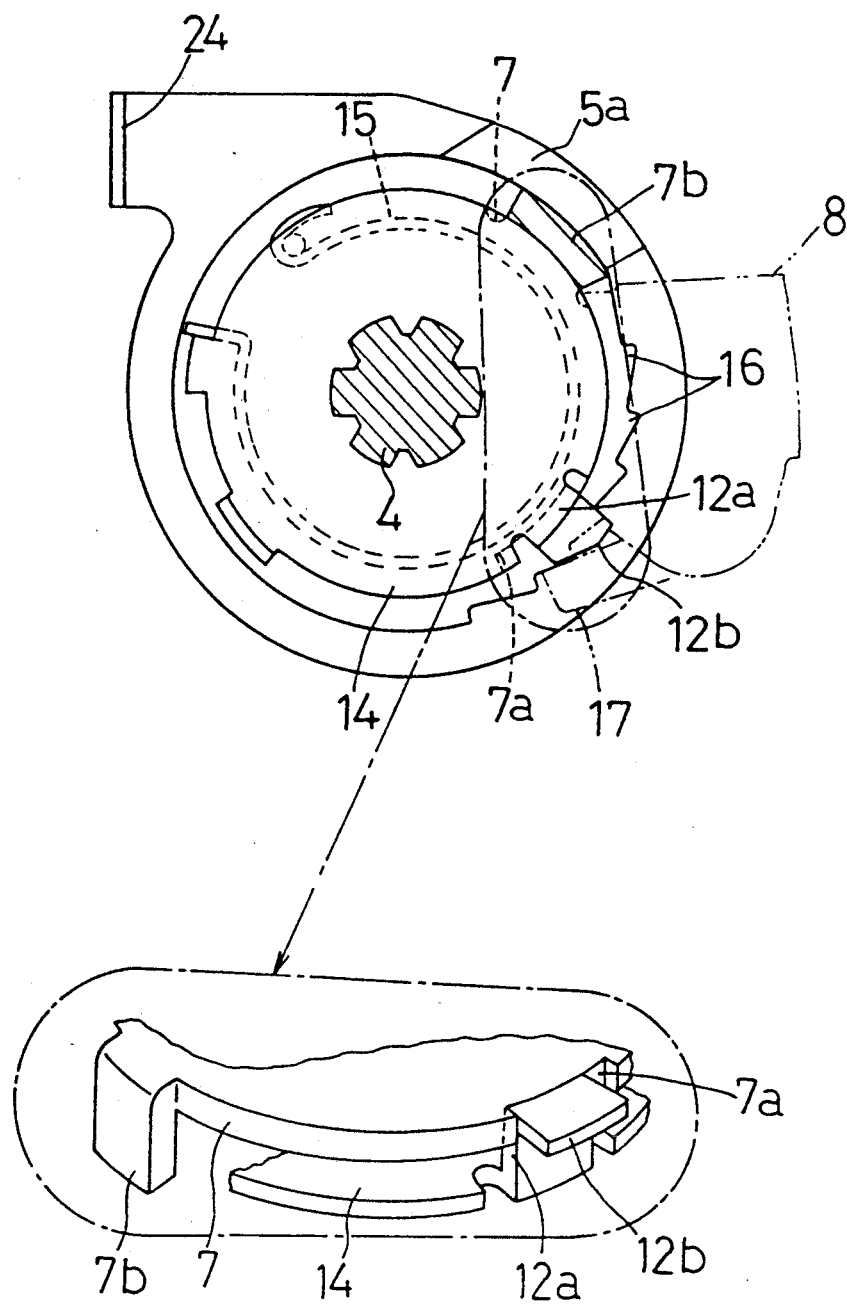
FIG. 5 is a section taken on line A of FIG. 4.
Figure 6:
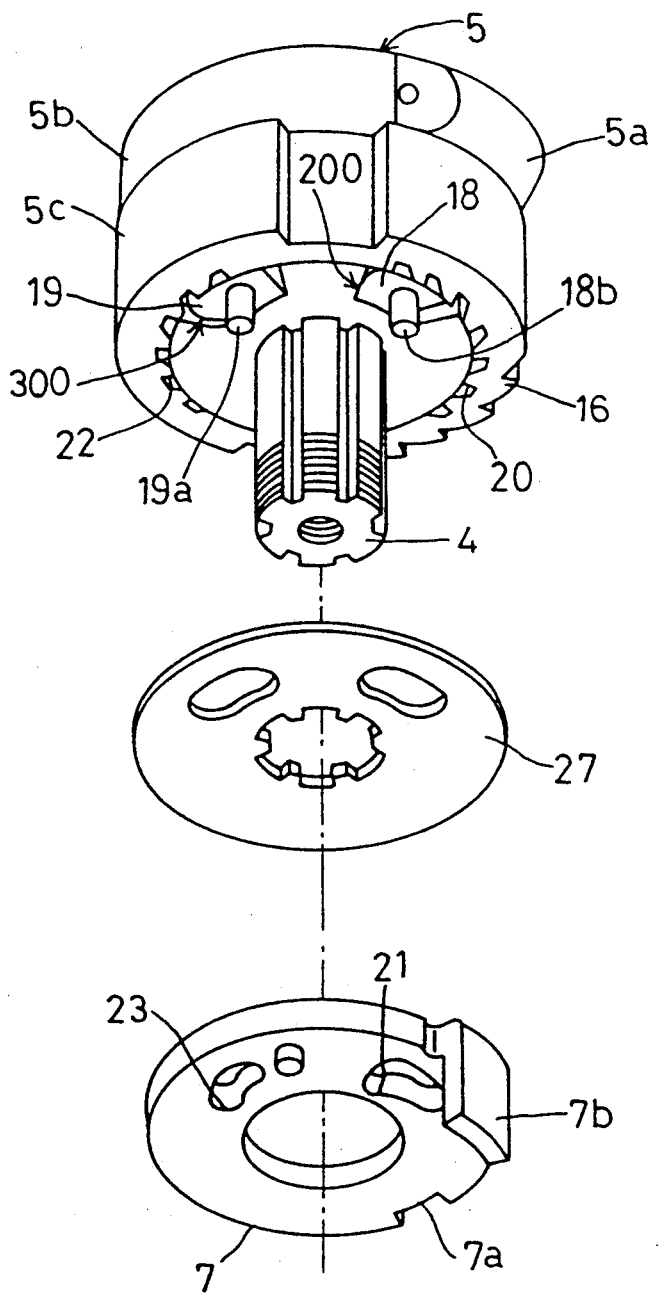
FIG. 6 is an exploded view showing principal components of the speed control apparatus.

As shown in FIGS. 4 through 6, the release element 7 is rotatably supported on the support shaft 4 through a spacer 13. The release element 7 is urged in the wire winding direction by a third spring 15 relative to a second stopper plate 14 mounted on the support shaft 4 not to be rotatable relative thereto. As shown in FIG. 3, and particularly an enlarged fragmentary view therein seen from above, the release element 7 defines a stopper recess 7a in a peripheral position thereof for receiving a stopper projection 12a extending from the second stopper plate 14 to limit a range of rotation of the release element 7. Further, the release element 7 includes a positioning projection 7b extending from a peripheral position thereof for contacting the shift lever 8 to determine the home position of the lever 8.

Figure 7:
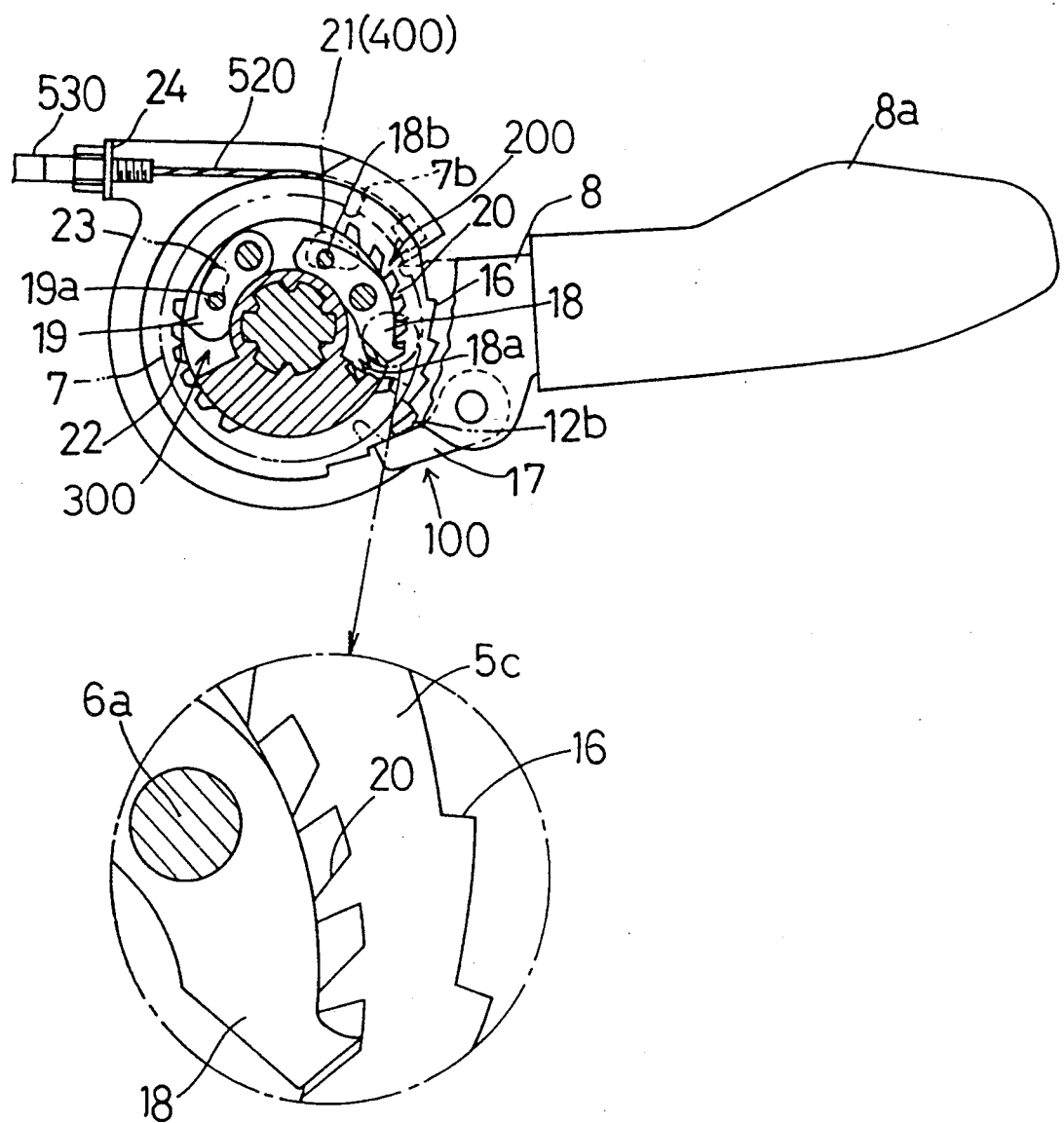
FIGS. 7 through 9 are views in cross section showing different operative states of the speed control apparatus.

The shift lever 8 is operatively connected to the takeup reel 5 through a one-way transmission device 100 as shown in FIGS. 4 and 7. The one-way transmission device 100 includes a plurality of one-way teeth 16 defined peripherally of the bush 5c of the takeup reel 5, a one-way pawl 17 pivoted to a pin 17a connected to the shift lever 8 for engaging the teeth 16, and a spring 17b for urging the one-way pawl 17 to an engaging position. With this one-way transmission device 100, when the shift lever 8 is turned in the wire winding direction, the takeup reel 5 is rotated in the same direction, the shift lever 8 being capable of returning in the wire unwinding direction independently of the takeup reel 5. The stopper projection 12a extending from the second stopper plate 14 includes a guide portion 12b for guiding the one-way pawl 17 in disengaging from the one-way teeth 16 when the shift lever 8 is in the home position.

As shown in FIGS. 4, 6 and 7, a position retaining device 200 includes a position retaining pawl 18 pivoted to a pawl shaft 6a extending parallel to the support shaft 4 from the pawl supporting sleeve 6 mounted on the support shaft 4, and position retaining teeth 20 defined on an inside peripheral wall of the bush 5c for engagement with the pawl 18.

A restricting device 300, which will be described later, is a mirror image of the position retaining device 200, and includes a restricting pawl 19 pivoted to a pawl shaft 6b extending from the pawl supporting sleeve 6, and restricting teeth 22 defined on an inside peripheral wall of the bush 5c for engagement with the pawl 19.

The takeup reel 5 is retained by the position retaining device 200 in stagewise stopping positions depending on winding lengths of the wire 520. The position retaining pawl 18 is urged by a pawl spring 18a to an engaging position. The position retaining pawl 18 and position retaining teeth 20 have an engaging structure and pawl shaft location determined so as to allow rotation in the wire winding direction of the takeup reel 5 by operation of the shift lever 8, and to prevent backward rotation in the wire unwinding direction of the takeup reel 5 and retain the takeup reel 5 in the stopping positions.

The position retention by the position retaining device 200 may be canceled by turning the shift lever 8 in the wire unwinding direction beyond the home position. An end of shift of the shift lever 8 in the unwinding direction from the home position is called herein the first shift end, while an end of shift thereof in the winding direction from the home position is called the second shift end. In this embodiment, the shift lever 8 in the shift from the first shift end to the second shift end describes a shifting locus substantially on a single plane, and is operable linearly.

The takeup reel 5 retained in position by the position retaining device 200 is releasable by a retention canceling device 400. As shown in FIG. 4, 6 and 7, the retention canceling device 400 includes a projection 18b extending from the position retaining pawl 18, and the release element 7 defining a cam bore 21 for receiving the projection 18b. When the release element 7 is rotated in the wire unwinding direction by the shift lever 8, the cam bore 21 guides the projection 18b to forcibly swing the position retaining pawl 18 out of engagement with the position retaining teeth 20. The takeup reel 5 freed by the retention canceling device 400 rotates in the wire unwinding direction under the force of the first spring 9.

The rotation in the unwinding direction of the takeup reel 5 during this unwinding operation is limited to a predetermined amount by the restricting device 300. The restricting device 300 includes, besides the restricting pawl 19 and restricting teeth 22, a projection 19a extending from the restricting pawl 19, and a restricting cam bore 23 defined in the release element 7 for receiving the projection 19a. When the release element 7 is caused by the shift lever 8 to rotate in the wire unwinding direction, the restricting cam bore 23 guides the projection 19a to forcibly swing the restricting pawl 19 for engagement with one of the restricting teeth 22. In this way, the restricting pawl 19 is moved into a locus for engaging one of the restricting teeth 22 before the position retention by the position retaining device 200 is canceled. Consequently, the rotation in the unwinding direction of the takeup reel 5 is limited to less than one pitch of the position retaining teeth 20.

In FIG. 7, numeral 24 denotes a bearing for the outer sleeve 530. In FIG. 4, numeral 25 denotes a lock nut for retaining the various components on the support shaft 4. Numerals 26 and 27 denote washers.

The way in which the speed control apparatus 1 constructed as above operates will be described next with reference to FIGS. 7 through 9. These drawings show sections of the apparatus 1 of FIG. 1 only in a way suited to description of the functions, and are not correct drawings in the strict meaning of graphics, from which components unnecessary to the description are omitted. For constructions of the various components, reference should be made to the exploded view in FIG. 6.

Figure 8:
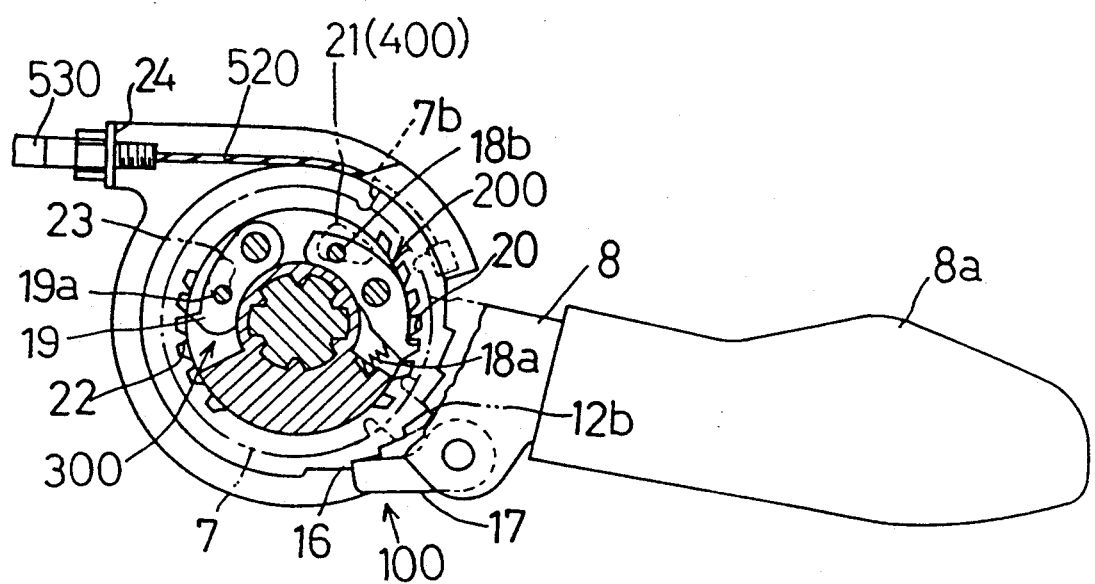

Referring to FIGS. 7 and 8, change speed in the wire winding direction is effected by pressing the shift lever 8 in the up-shift direction with a thumb. At this time, a force is transmitted through the one-way transmission device 100 to rotate the takeup reel 5 in the winding direction, i.e. clockwise in the drawings. When the cyclist stops pressing the shift lever 8 with the thumb, the takeup reel 5 stops in position by the action of the position retaining device 200, whereas the shift lever 8 returns independently of the takeup reel 5 by the freeing action of the one-way transmission device 100 and stops at the home position by contact with the positioning projection 7b. It is of course possible to effect multistep change speed in a single operation by shifting the shift lever 8 a corresponding amount.

Figure 9:
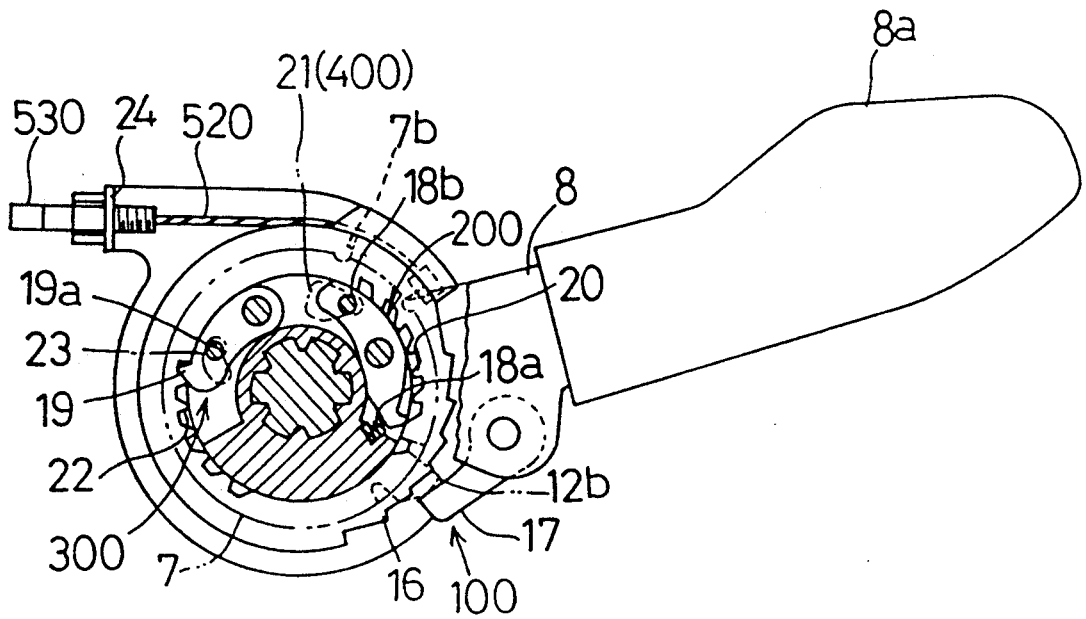

Referring to FIG. 9, change speed in the wire unwinding direction is effected by pressing the shift lever 8 in the down-shift direction with the thumb. At this time, the release element 7 having the positioning projection 7b rotates in the unwinding direction to cancel the action of the position retaining device 200 and to operate the restricting device 300 to limit the backward rotation in the unwinding direction of the takeup reel 5 within one pitch of the position retaining teeth 20. When the cyclist stops pressing the shift lever 8 with the thumb, the release element 7 returns in the winding direction under the force of the third spring 15 to cancel the action of the restricting device 300 and to cause the position retaining device 200 to retain the takeup reel 5 in a position one step backward in the unwinding direction. At the same time, the shift lever 8 returns to the home position.

The pivoting directions of the shift lever 8 and the accelerating and decelerating directions of the speed control apparatus may be reversed from those directions described in the foregoing embodiment.

Further, one of the accelerating operation and decelerating operation may be carried out by pivoting the shift lever, and the other carried out by a touch type control element such as a push button.

What is claimed is:

1. A bicycle control apparatus attached to a handlebar having a grip, comprising:

a support shaft disposed below said grip;

a shift lever pivotable about said support shaft, said shift lever having a control knob, said shift lever being pivotable between a downshift position, a neutral position, and an upshift position, said neutral position being located between said downshift position and said upshift position, and wherein the entire range of pivotal movement of said shift lever is between said downshift position and said upshift position;

urging means for urging said shift lever toward said neutral position;

control means for controlling a change speed wire based on a pivotal displacement of said shift lever, such that pivotal movement of said shift lever from said neutral position to said downshift position effects a downshift, and such that pivotal movement of said shift lever from said neutral position to said upshift position effects an upshift; and a brake lever, said brake lever being pivotable about an axis of rotation; and wherein a tangent to a substantial locus of movement of said control knob during pivotal movement of said shift lever from said neutral position to said downshift position approximates a direction in which said grip extends, and wherein a tangent to a substantial locus of movement of said control knob during pivotal movement of said shift lever from said neutral position to said upshift position approximates the direction in which said grip extends, and wherein said support shaft is substantially parallel to the axis of rotation of said brake lever.

2. A control apparatus as claimed in claim 1, further comprising: a bracket fixed to said handlebar and having an extension extending away from said handlebar; and wherein said support shaft is attached to said extension, and wherein said support shaft is substantially perpendicular to the direction in which said grip extends 3. A control apparatus as claimed in claim 2, wherein said control knob is provided in a distal end region of said shift lever, and said loci of movement are substantially within a width of said grip as seen from an end face of said support shaft.

4. A control apparatus as claimed in claim 3, wherein said brake lever has a range of pivotable movement between a brake releasing position remote from said grip and a brake applying position close to said grip.

5. A bicycle system, comprising:
a handle bar having a grip, said grip extending in a first direction; and
a shift lever for controlling a change speed wire, said shift lever being pivotable about an axis of rotation, said shift lever having a distal control portion, said shift lever being pivotable from a neutral position to an up-shift end position, and from said neutral position to a down-shift end position, with said neutral position being between said up-shift and said down-shift end positions, and wherein the entire range of pivotal movement of said shift lever is between said up-shift and down-shift end positions, and wherein a tangent to a substantial locus of movement of said control portion during the entire range of pivotal movement of said shift lever approximates the direction in which said grip extends.

* * * * *